United States Patent
Ahmed et al.

(10) Patent No.: US 6,886,638 B2
(45) Date of Patent: May 3, 2005

(54) FIELD WELDABLE CONNECTIONS

(75) Inventors: Hebah Ahmed, Houston, TX (US);
Harjit S. Kohli, Sugar Land, TX (US);
Ben A. Donnell, Missouri City, TX (US)

(73) Assignee: Schlumbergr Technology Corporation, Sugar Land, TX (US)

( * ) Notice: Subject to any disclaimer, the term of this patent is extended or adjusted under 35 U.S.C. 154(b) by 35 days.

(21) Appl. No.: 09/970,353

(22) Filed: Oct. 3, 2001

(65) Prior Publication Data

US 2003/0062157 A1 Apr. 3, 2003

(51) Int. Cl.⁷ .............................. E21B 41/00; H02G 3/06
(52) U.S. Cl. .................. 166/385; 166/65.1; 166/242.6; 174/88 R; 174/110 E; 174/110 SR
(58) Field of Search .................. 166/385, 373, 166/65.1, 169, 242.3, 242.6; 174/84 R, 88 R, 59, 75 R, 121 SR, 114 R, 110 SR, 110 E (56) References Cited

U.S. PATENT DOCUMENTS

| | | | | | |
|---|---|---|---|---|---|
| 3,145,421 | A | * | 8/1964 | Colbert | 249/90 |
| 3,846,578 | A | * | 11/1974 | Bahder et al. | 174/88 R |
| 4,403,110 | A | * | 9/1983 | Morrisette | 174/84 R |
| 4,484,022 | A | * | 11/1984 | Eilentropp | 174/84 R |
| 4,501,927 | A | * | 2/1985 | Sievert | 174/93 |
| 4,549,039 | A | * | 10/1985 | Charlebois et al. | 174/72 R |
| 4,627,490 | A | * | 12/1986 | Moore | 166/65.1 |
| 4,839,470 | A | * | 6/1989 | Ventura | 174/84 R |
| 4,968,857 | A | * | 11/1990 | McGrane | 174/84 C |
| 5,006,286 | A | * | 4/1991 | Dery et al. | 264/408 |
| 5,315,065 | A | * | 5/1994 | O'Donovan | 174/84 C |
| 5,509,202 | A | * | 4/1996 | Abdow | 29/871 |
| 6,422,304 | B1 | * | 7/2002 | Slovikosky | 165/80.4 |

* cited by examiner

*Primary Examiner*—David Bagnell
*Assistant Examiner*—Jennifer Gay
(74) *Attorney, Agent, or Firm*—Trop, Pruner & Hu PC; Jaime Castaño; Brigitte Echols (57) ABSTRACT

The present invention provides a field weldable connection.

27 Claims, 7 Drawing Sheets

FIELD WELDABLE CONNECTIONS

FIELD OF THE INVENTION

The subject matter of the present invention relates to communication lines. More specifically, the subject matter of the present invention relates to an apparatus and method of protecting and sealing spliced communication lines.

BACKGROUND OF THE INVENTION

Communication lines are used in a wide range of applications in the oilfield industry. The communication lines transmit monitored data regarding downhole conditions such as temperature and pressure to surface instrumentation. The communication lines can also be used to send information down the well from the surface. Additionally, communication lines may also be used to electrically power downhole equipment. Communication lines may include electrical conduits, optical fibers, and other methods for data or power transmission.

In environments such as those encountered in downhole wells, the communication lines are exposed to hostile conditions such as elevated temperatures and pressures. To protect the fragile communication lines from the hostile conditions, the communication lines are generally carried within protective tubing that provides an environmental seal. Problems arise when the seal must be broken during assembly, installation and/or repair of the communication line. For example, in downhole applications, in order for the communication line to be fed through production equipment such as packers, the line must be cut and then spliced with the downstream line. Thus, after splicing, the communication line must once again be sealed from the harsh environment.

There exists, therefore, a need for an apparatus and method of splicing communication lines that provides structural integrity and protects the communication line from the surrounding environment.

DETAILED DESCRIPTION OF PREFERRED EMBODIMENTS

In the following detailed description of the subject matter of the present invention, the apparatus and method of splicing communication lines is principally described with reference to downhole well applications. Such description is intended for illustration purposes only and is not intended to limit the scope of the present invention. In addition to downhole well applications, the present invention can be used with any number of applications such as pipeline monitoring, subsea well monitoring, and data transmission, for example. Furthermore, the communication lines may comprise electrical wiring, which may facilitate transfer of information, power, or both. All such types of communication line splicing are intended to fall within the purview of the present invention. However, for purposes of illustration, the present invention will be principally described as being used in downhole well applications. Further as used herein, the term communication line shall refer to those lines comprising electrical lines or fiber optic lines, as well as lines including combinations thereof or combinations with other types of lines.

Figure 1:
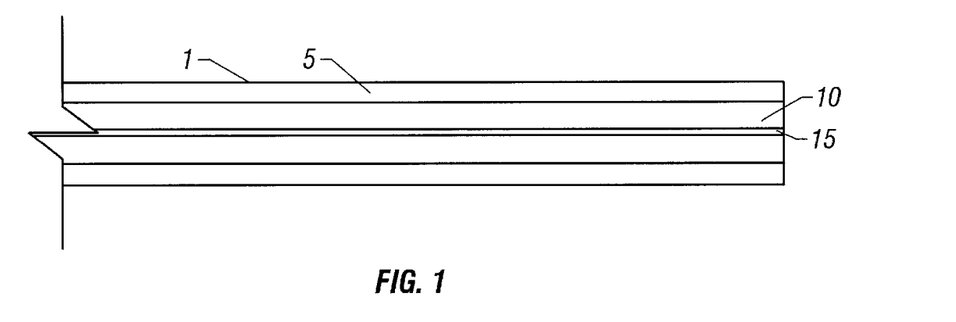
FIG. 1 is a sketch of a communication cable.

FIG. 1 provides a sketch of a typical cable 1 useful in the present invention. The cable 1 comprises an outer housing 5, a secondary housing 10, and one or more communication lines 15. The outer housing 5 provides the structural integrity for the communication line 1 and protects the communication lines 15 from the surrounding environment. Further, the outer housing 5 provides structural protection for the communication lines 15 from damage caused by the cable 1 impacting, or being impacted by, nearby tools and equipment. In one embodiment, the outer housing 5 is comprised of a metallic material such as steel, or other metallic alloys, for example. The secondary housing 10 resides within the outer housing 5 and provides protection for the communication lines 15 contained within. In one embodiment, shown in FIG. 1, the secondary housing 10 is made from a polymeric material.

Figure 2:
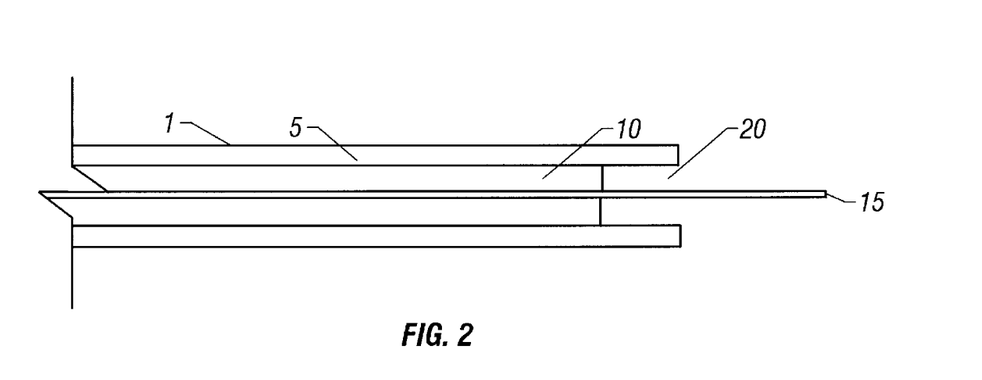
FIG. 2 is a sketch of a section of cable that has been prepared for splicing.

FIG. 2 provides a sketch of a segment of cable that has been prepared for splicing. The cable 1 has been cut so that the communication line 15 extends longitudinally beyond the outer housing 5 and the secondary housing 10. Afterwards, a portion of the secondary housing 10 is removed in order to create a void 20, which is defined by the outer housing 5 and the secondary housing 10.

Figure 3:
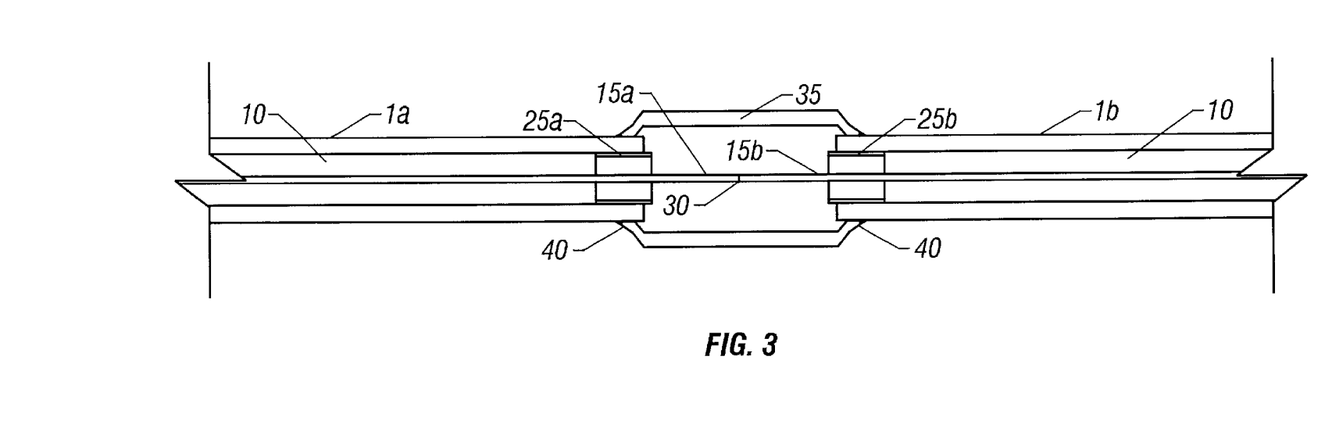
FIG. 3 is a sketch of the welded splice assembly.

FIG. 3 provides a sketch illustrating the communication line splice of the present invention. In FIG. 3, the two communication lines being spliced are designated 15a and 15b. Once the cables 1a, 1b have been prepared for splicing, thermal insulators 25a, 25b are inserted into the void 20 (shown in FIG. 2) so that the insulators 25a, 25b lie between the outer housing 5 and the communication lines 15a, 25b. The insulators 25a, 25b protect the communication lines 15a, 15b from the heat of the welding. Additionally, the insulators 25a, 25b prevent the secondary housing from melting and outgassing, which can result in poor weld quality. Prior to splicing, a weld coupling 35 is slid over one of the cables 1a, 1b. The cleaved communication lines 15a, 15b are then spliced together by conventional techniques, such that the communication lines 15a, 15b are operatively connected at the splice 30. The weld coupling 35 is then slid to cover the ends of both cables 1a, 1b, and the weld coupling 35 is secured in place by welds 40. In one embodiment the welds 40 are formed using an orbital welder. Once welded, the weld coupling 35 protects the splice 30 from corrosion, erosion, and physical damage resulting from environmental and operational conditions. Additional protection is provided against hydrocarbon darkening resulting from contact with conductive fluid.

Figure 4:
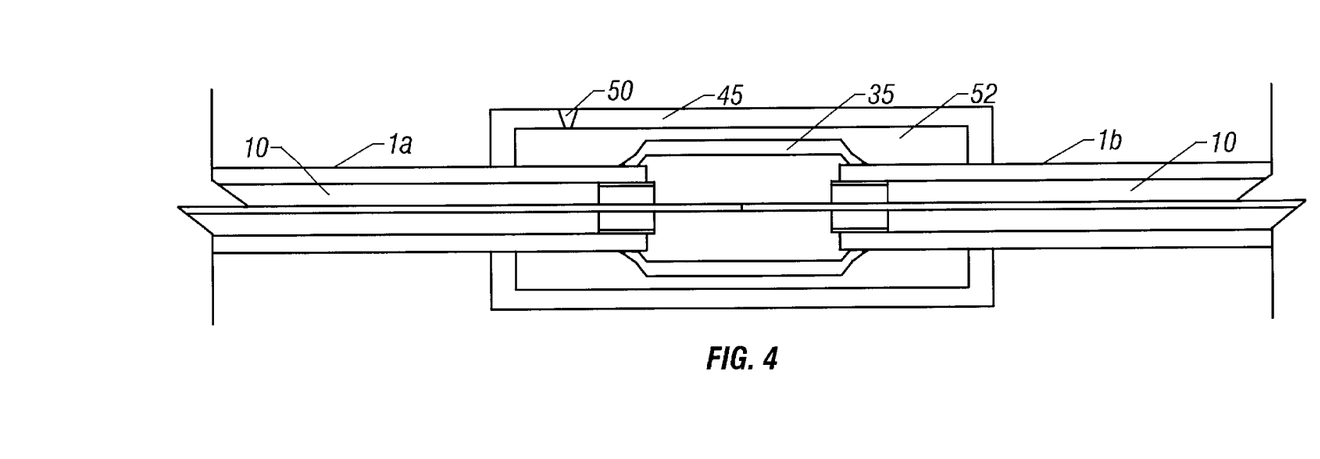
FIG. 4 is a sketch of another embodiment of the welded splice assembly having a pressure housing.

FIG. 4 provides a sketch of another embodiment of the weld assembly. In this embodiment, a pressure housing 45 fits over the weld coupling 35. The pressure housing 45 is slid over the same cable 1a, 1b as the weld coupling 35, but is slid prior to the sliding of the weld coupling 35. After splicing and after the weld coupling 35 is secured in place, the pressure housing 45 is attached to the cables 1a, 1b such that the weld coupling 35 is isolated from environmental conditions. For example the housing may be attached by welding, ferrules, or elastomeric seals, among other means. A port 50, located in the pressure housing 45 enables pressure testing of the welded assembly.

Figure 5:
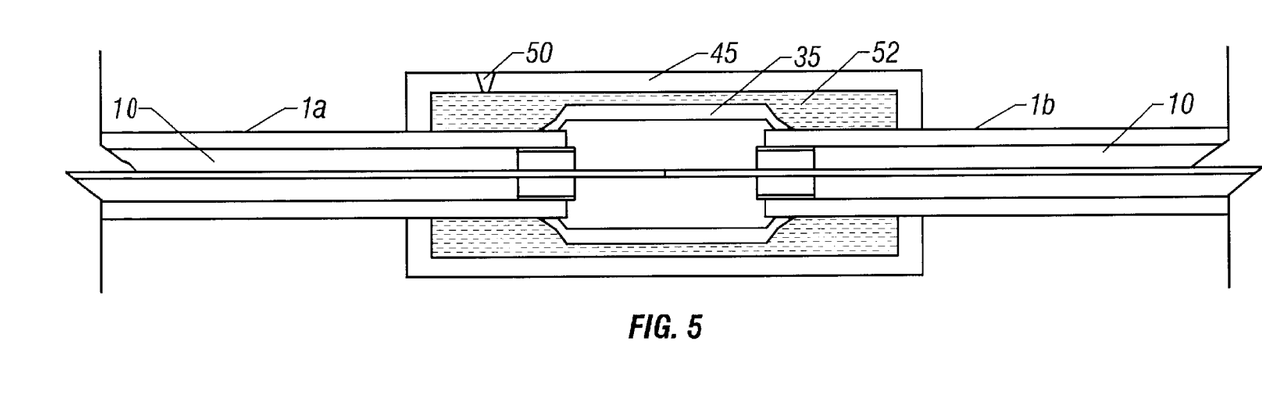
FIG. 5 is a sketch of another embodiment of the welded splice assembly having a gel or epoxy material within the pressure housing.

FIG. 5 provides a sketch of another embodiment of the weld assembly. In this embodiment a gel or epoxy material is pumped through the port into a cavity 52 defined by the pressure housing 45, the cables 1a, 1b, and the weld coupling 35. This fluid is used for pressure testing. The fluid is pumped into the cavity 52 at a high pressure, and the welded splice assembly is monitored for signs of failure. After pumping, the port 50 is plugged to seal in the viscous fluid. When the spliced section of cable is installed downhole, the viscous fluid cures and hardens due to the high downhole temperatures. The cured material thus provides additional protection for the splice 30 against erosion, corrosion, and other environmental conditions.

Figure 6:
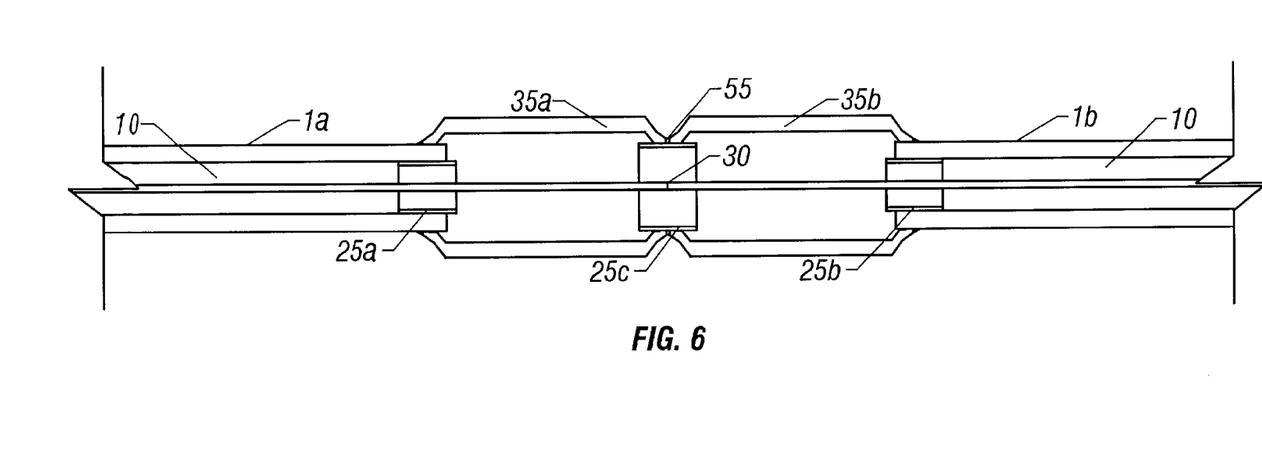
FIG. 6 is a sketch of another embodiment of the welded splice assembly having a plurality of weld couplings.

FIG. 6 provides a sketch of another embodiment of the weld assembly having a plurality of weld couplings 35a, 35b. The embodiment shown in FIG. 6 shows two couplings, but any number can be used and remain within the purview of the invention. The first weld coupling 35a is slid over the first cable 1a and the second weld coupling 35b is slid over the second cable 1b. An additional thermal insulator 25c is inserted to protect the splice 30 at the housing junction 55. After the cables 1a, 1b are spliced, the first weld coupling 35a is welded to the first cable 1a and the second weld coupling 35b is welded to the second cable 1b. The first weld coupling 35a is then welded to the second weld coupling 35b at the housing junction 55, thereby enclosing the splice 30. In this manner, both welds near the secondary housing 10 are formed prior to the weld couplings 35a, 35b being sealed to the surrounding environment. Thus, any resulting outgassing of the secondary housing 10 is able to escape to the environment and does not affect the weld quality.

Figure 7:
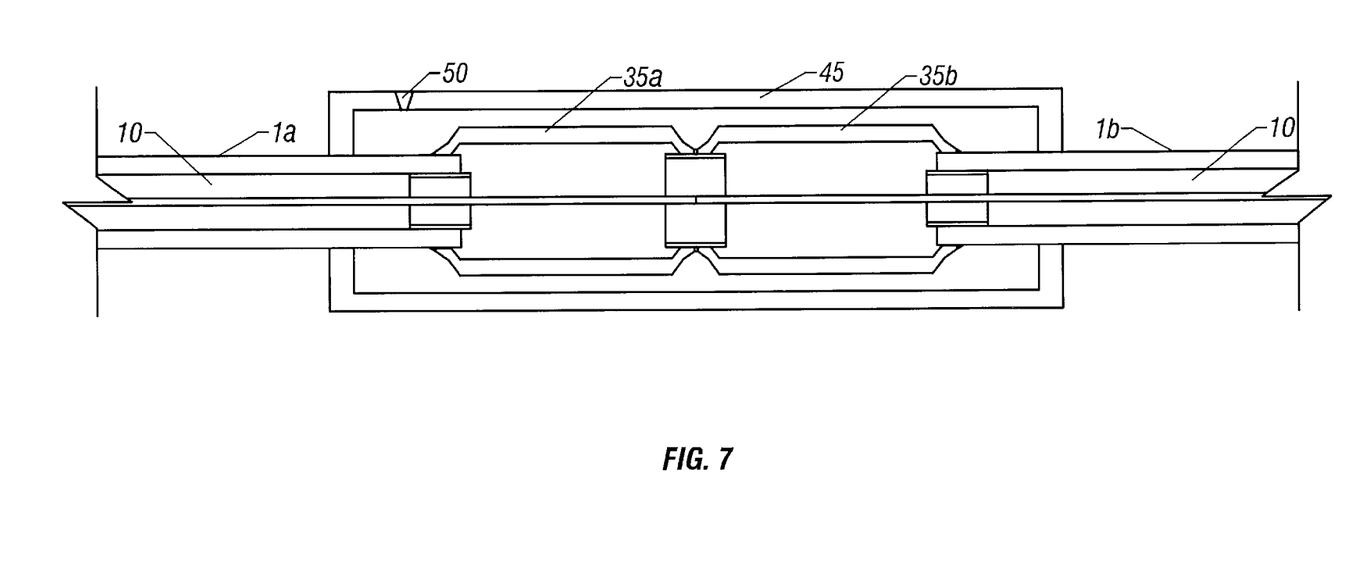
FIG. 7 is a sketch of another embodiment of the welded splice assembly having a plurality of weld couplings and a pressure housing.

FIG. 7 provides a sketch of another embodiment of the weld assembly. In this embodiment, the pressure housing 45 protects the two weld couplings 35a, 35b against erosion and other damaging environmental conditions. The pressure housing 45, through its port 50, enables testing of the welded connections with a standard fluid for pressure testing, such as hydraulic oil, or by a different viscous fluid, such as a gel or epoxy material.

Figure 8:
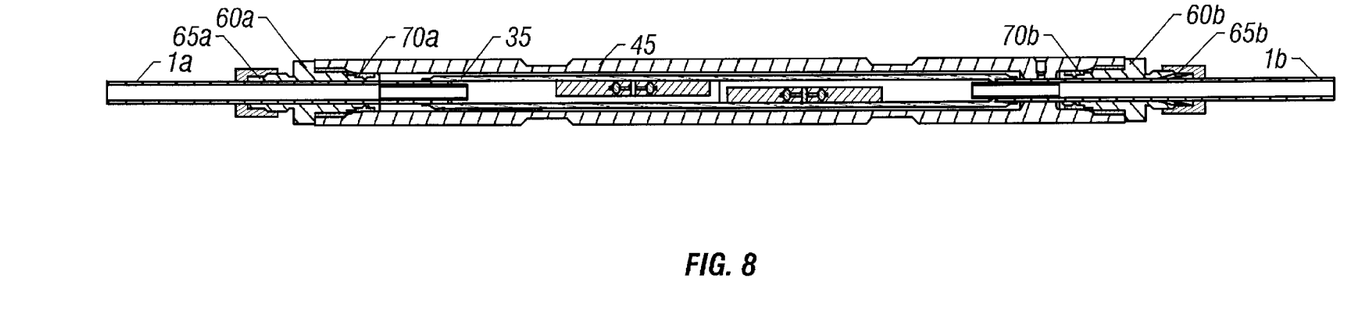
FIG. 8 is a sketch of another embodiment of the welded splice assembly.

FIG. 8 provides a sketch of another embodiment of the pressure housing 45. In this embodiment, the pressure housing 45 is attached to the cables 1a, 1b by means of fittings 60a, 60b. The first fitting 60a and the pressure housing 45 are slid over the first cable 1a. The second fitting 60b is slid over the second cable 1b. After splicing, the fittings 60a, 60b and the pressure housing 45 are positioned such that the weld coupling 35 is contained within the pressure housing 45. The fittings 60a, 60b are then tightened, thereby sealing the welded connections inside the pressure housing 45. The fittings 60a, 60b in this embodiment seal to the cables 1a, 1b through a dual ferrule system 65. The fittings 60a, 60b seal onto the pressure housing 45 by means of an elastomeric seal 70. These sealing mechanisms 65, 70 are not the only means by which the seals can be made. All mechanisms by which one could sealingly join the pressure housing 45 and the cables 1a, 1b are intended to fall within the purview of the present invention.

Figure 9:
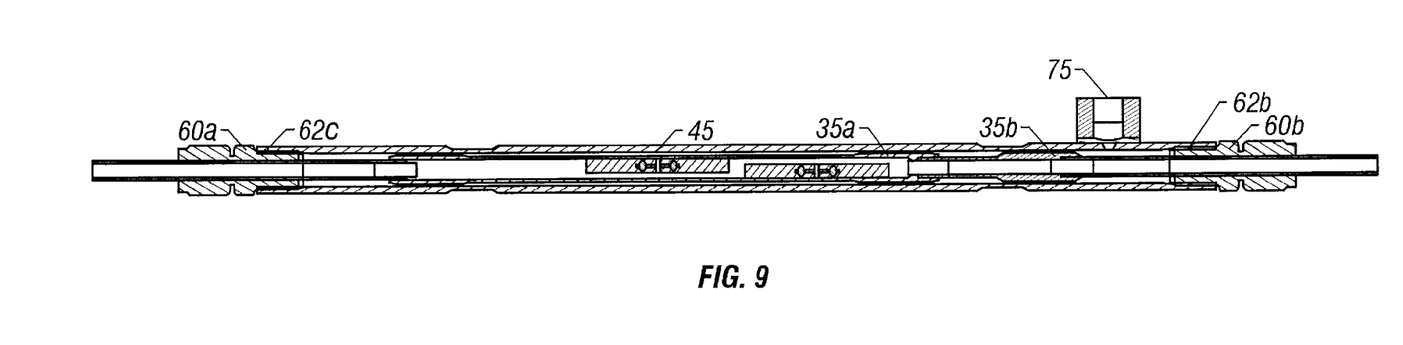
FIG. 9 is a sketch of another embodiment of the welded splice assembly having a plurality of weld couplings.

FIG. 9 provides a sketch of another embodiment of the splice assembly. In this embodiment, the fittings 60a, 60b are connected to pressure housing 45 by means of a sealing pipe thread 62. A removable port 75 is used to pressure test the welded splice assembly.

Figure 10:
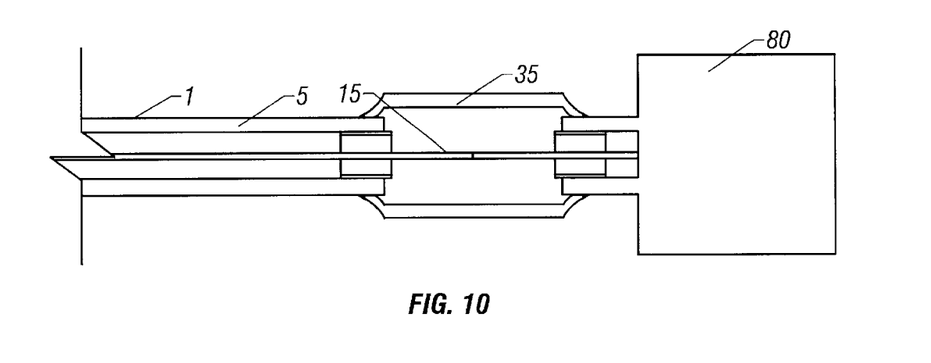
FIG. 10 is a sketch of another embodiment of the welded splice assembly attached to a tool.

FIG. 10 provides a sketch of another embodiment of the splice assembly. In this embodiment, communication line 15 is spliced to a downhole tool 80. The weld coupling 35 is welded to the outer housing 5 on one side and a section of the tool 80 on the opposite side.

Figure 11:
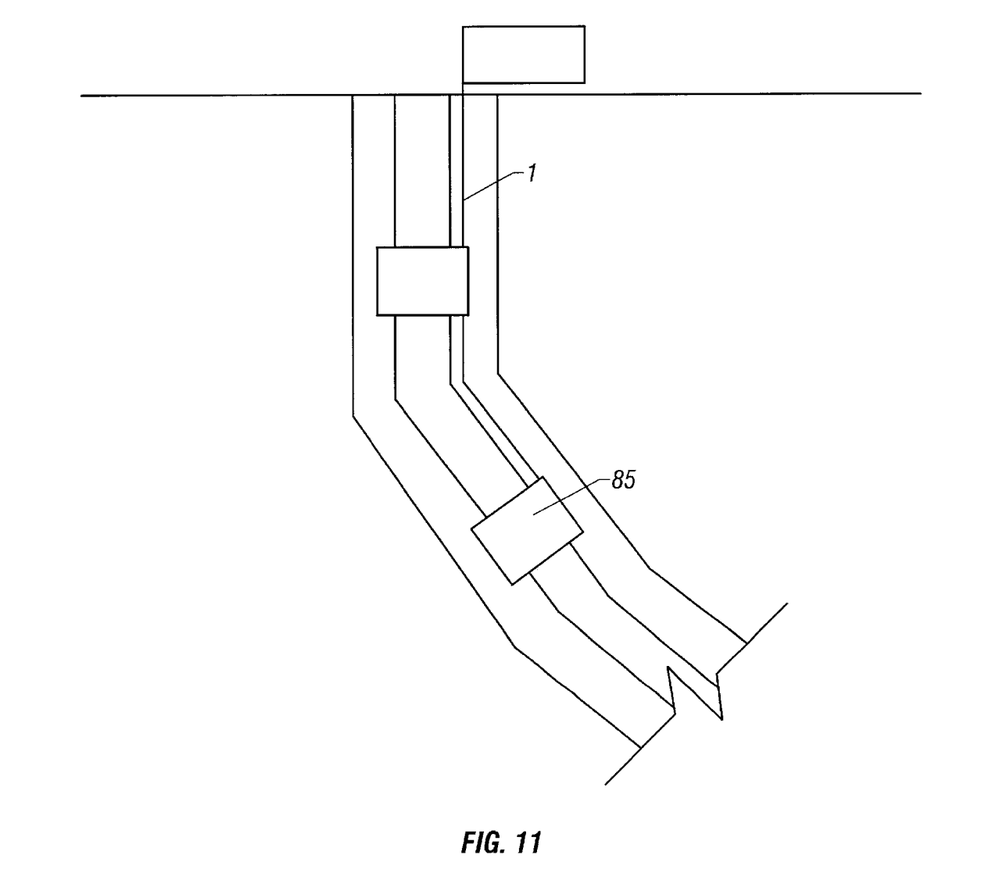
FIG. 11 is a sketch of a wellbore completion including a spliced communication line.

FIG. 11 provides a sketch of a wellbore completion including a spliced communication line. The cable 1 is installed downhole to communicate with or power a piece of downhole equipment 85. The equipment 85 may be controlled by a controller located at the surface.

Figure 12:
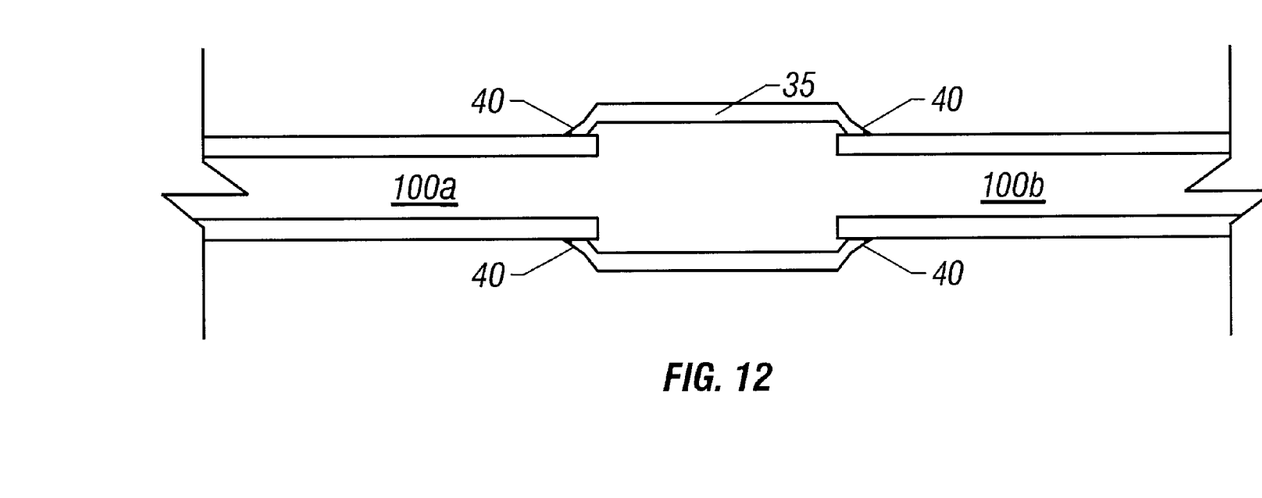
FIG. 12 provides a sketch of the welded splice assembly used for a hydraulic or fluid conduit.

FIG. 12 provides a sketch of the welded splice assembly used for a hydraulic or fluid conduit. In FIG. 12, a weld coupling 35 is secured over the spliced hydraulic or fluid conduits 100a, 100b by welds 40. Once welded, the resulting spliced hydraulic or fluid line can be pressure tested prior to placement downhole.

The invention being thus described, it will be obvious that the same may be varied in many ways. Such variations are not to be regarded as a departure from the spirit and scope of the invention, and all such are intended to be included within the scope of the following non-limiting claims:

What is claimed is:

1. A downhole connector assembly for sealingly attaching a first and a second segment of a control line having an outer housing that encapsulates a polymeric secondary housing having a communication line therein that extends therefrom, comprising:

at least one weld coupling welded to the outer housing of the first and second segment of the control line; and at least one thermal insulator separate from the secondary housing, said at least one thermal insulator located between the communication line and the welds of the weld coupling.

2. The downhole connector assembly of claim 1, further comprising a protective housing containing the at least one weld coupling therein.

3. The downhole connector assembly of claim 2, wherein the protective housing is filled with an epoxy.

4. The downhole connector assembly of claim 2, wherein the protective housing is filled with a gel.

5. The downhole connector assembly of claim 2, wherein the protective housing comprises a port adapted for pressure testing the downhole connector assembly.

6. A protective splice assembly, comprising:

a first cable having an outer housing and a polymeric secondary housing having a communication line therein;

a second cable having an outer housing and a polymeric secondary housing having a communication line therein;

a spliced connection between the communication lines of the first and second cables;

at least one weld coupling welded to the outer housings of the first and second cables; and wherein the first cable comprises a thermal insulator separate from the polymeric secondary housing and located intermediate said at least one weld and the communication line of the first cable.

7. The protective splice assembly of claim 6, adapted for downhole application.

8. The protective splice assembly of claim 6, wherein the outer housing comprises a metallic material.

9. The protective splice assembly of claim 6, wherein the outer housing comprises a steel alloy.

10. The protective splice assembly of claim 6, wherein the communication line of the first cable transfers data.

11. The protective splice assembly of claim 6, wherein the communication line of the first cable transfers power.

12. The protective splice assembly of claim 6, wherein the communication line comprises an electrical line.

13. The protective splice assembly of claim 6, wherein the communication line comprises a fiber optic line.

14. The protective splice assembly of claim 6, wherein the at least one weld coupling is welded with an orbital welder.

15. The protective splice assembly of claim 6, further comprising a pressure housing secured to the first and second cables such that the at least one weld coupling is isolated from the surrounding environment.

16. The protective splice assembly of claim 15, wherein the pressure housing is secured by welding.

17. The protective splice assembly of claim 15, wherein the pressure housing is secured by ferrules.

18. The protective splice assembly of claim 15, wherein the pressure housing is secured by elastomeric seals.

19. The protective splice assembly of claim 15, wherein the pressure housing comprises a port adapted for pressure testing.

20. The protective splice assembly of claim 15, wherein the pressure housing is filled with a gel.

21. The protective splice assembly of claim 15, wherein the pressure housing is filled with an epoxy.

22. A downhole connector assembly for sealingly attaching a first and a second segment of a control line having a polymeric secondary housing having a communication line therein, comprising:

at least one weld coupling; and means for thermally protecting the communication line, said means comprising a thermal insulator separate from the polymeric secondary housing and located between the communication line and the weld coupling.

23. A method for providing a downhole control line, comprising:

providing a first and a second segment of a control line having a polymeric secondary housing having a communication line therein;

removing a portion of the secondary housing to create a void around the communication line;

inserting at least one thermal insulator into the void around the communication line;

providing a weld coupling; and inserting the first and second segments of the control line into the weld coupling and welding the segments in place.

24. The method of claim 23, further comprising: providing a protective housing containing the weld coupling therein.

25. The method of claim 23, further comprising: filling the protective housing with an epoxy.

26. The method of claim 23, further comprising: filling the protective housing with a gel.

27. The method of claim 23, further comprising: pressure testing using a port of the protective housing.

* * * * *